Patented Oct. 16, 1934

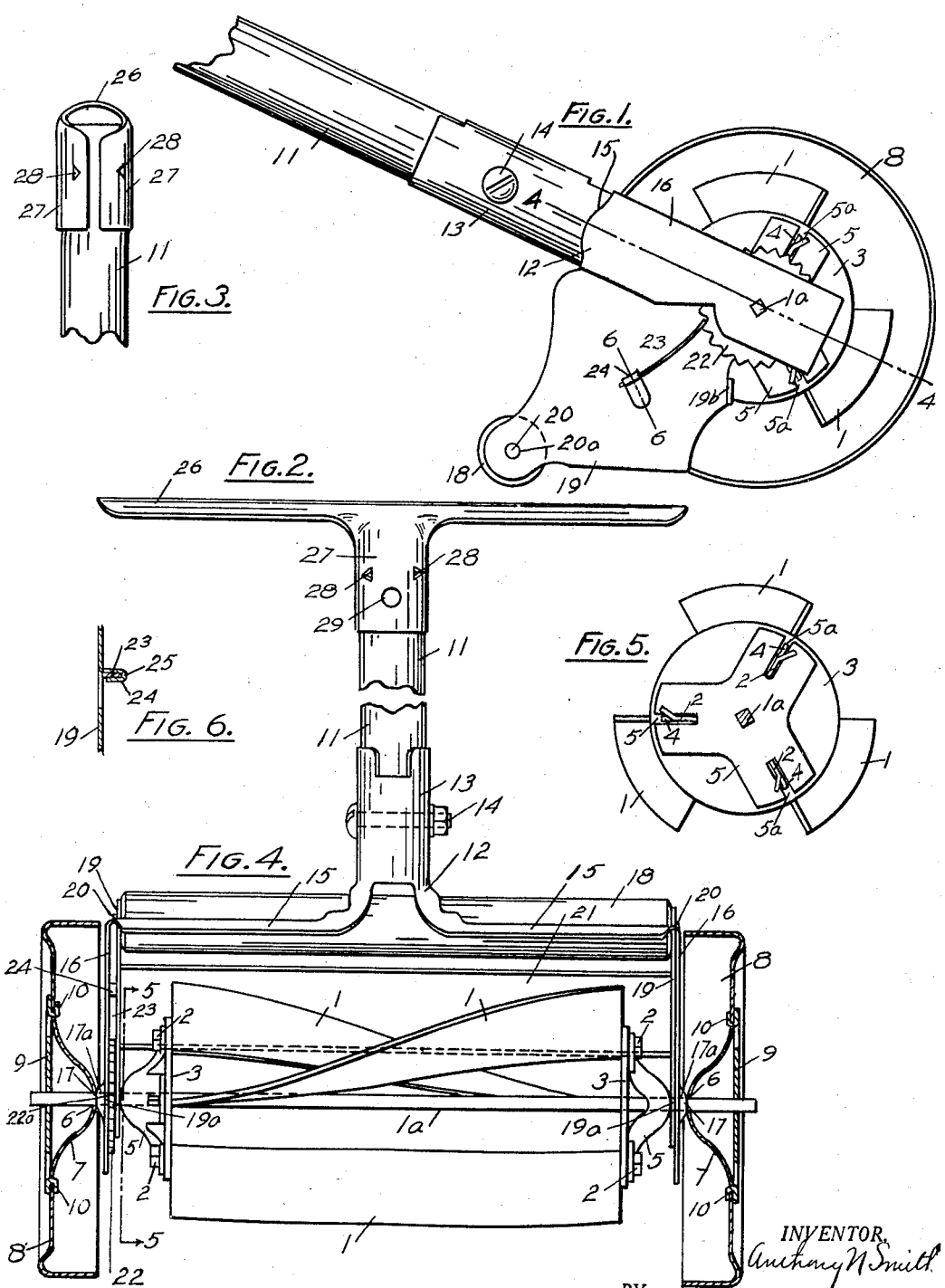

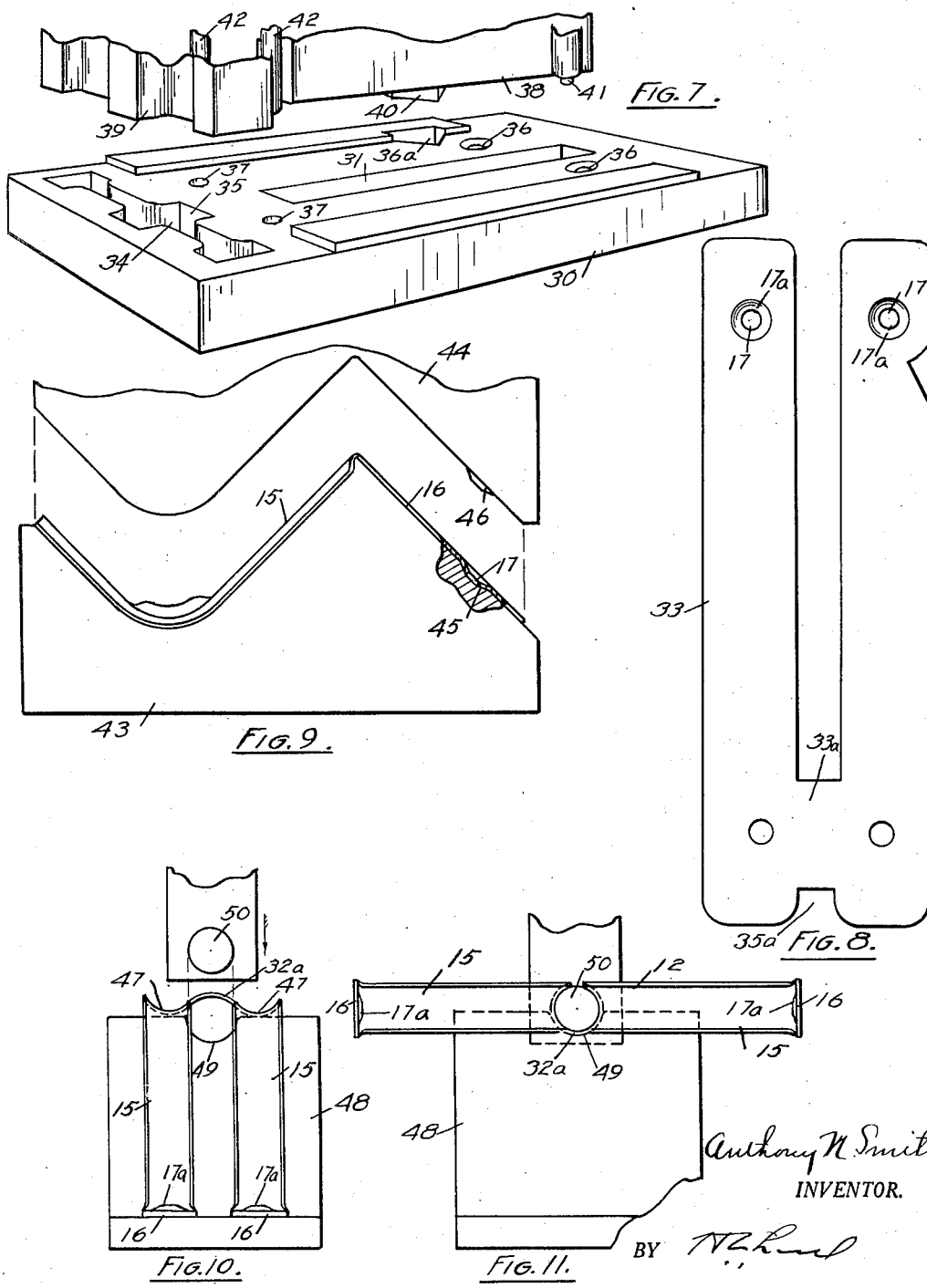

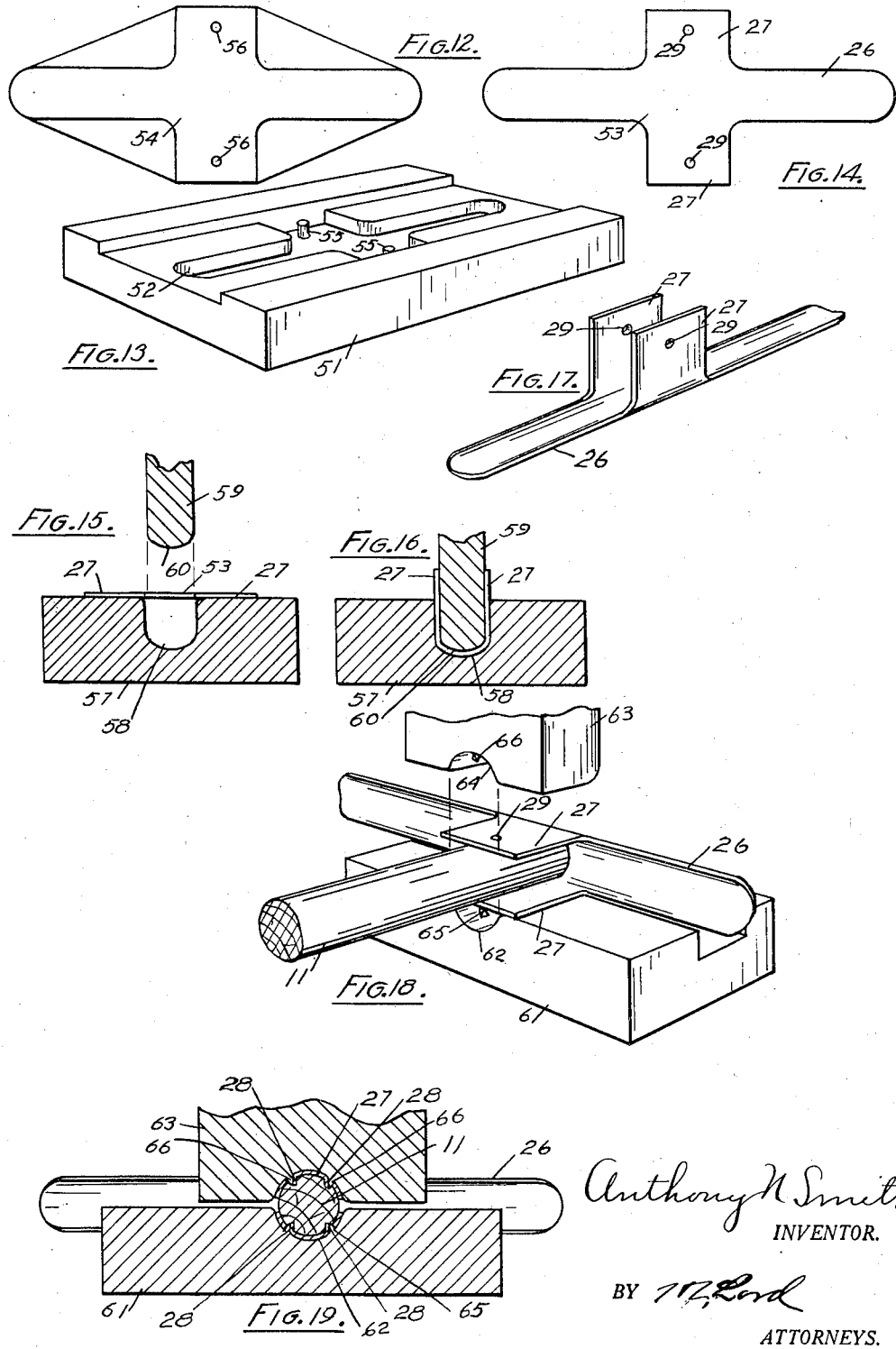

1,977,457

UNITED STATES PATENT OFFICE 1,977,457

TOY LAWN MOWER

Anthony N. Smith, Girard, Pa., assignor to The Girard Model Works Inc., Girard, Pa., a corporation of Pennsylvania Application May 27, 1933, Serial No. 673,131

7 Claims. (Cl. 46—47)

The present invention is directed to the production of a toy lawn mower having sufficient resemblance to the ordinary lawn mower to satisfy the fancy of children. In carrying out such invention it is necessary that it have a visible operation similar to a lawn mower and that it also correspond to some extent at least with the ordinary lawn mower in sound produced by operation. To make such a toy of commercial practicability it is necessary that it may be made cheaply enough so that it may be merchandized as a toy and sufficiently rugged to satisfy the purchaser in this respect. The present invention is designed to accomplish these requirements in a simple and advantageous manner. Features and details of the invention will appear from the specification and claims.

Preferred embodiment of the toy are illustrated in the accompanying drawings as follows:—

Fig. 1 shows a side elevation of the toy, partly in section.

Fig. 2 a plan view of the cross bar on the handle.

Fig. 3 an end elevation of the cross bar.

Fig. 4 a section on the line 4—4 in Fig. 1.

Fig. 5 a section on the line 5—5 in Fig. 4.

Fig. 6 a section on the line 6—6 in Fig. 1.

Fig. 7 a perspective view of the stamping die for blanking the yoke used in the toy.

Fig. 8 a plan view of the yoke.

Fig. 9 a side elevation of a forming die.

Fig. 10 an end elevation of a further forming die.

Fig. 11 a similar view with the press closed.

Fig. 12 a die carried by the plunger for forming the cross bar blank.

Fig. 13 the die operating with the plunger die.

Fig. 14 a plan view of the blank.

Fig. 15 a section of forming dies operating on the bank, the dies being in open position.

Fig. 16 a similar view with the press closed.

Fig. 17 a perspective view of the cross bar as it comes from the press shown in Fig. 7.

Fig. 18 a press showing the manner of forming the handle shank on the cross bar, the press being open.

Fig. 19 a similar view with the press closed.

Blades 1 are provided with ears 2 at each end. These ears extend through slits 4 in discs 3 at the ends of the blades. A spacing plate 5 has slits 5a through which the ears 2 also extend. These ears are headed over thus securing the blades to the discs and also the spacing plate to the discs. The discs and spacing plate are mounted on a square shaft, or rod, 1a. This rod extends through openings 6 in detent portions 7 of wheels 8. A plate 9 also engages the rod and is secured by ears 10 to the wheels, these ears extending through perforations in the wheels. The wheels may be fashioned at their peripheries in imitation of the ordinary lawn mower wheels.

A handle 11 is secured to a yoke 12. This yoke 12 has a shank 13 which is split at one side and the shank is secured to the handle by a bolt 14. The yoke has cross extensions 15 extending from the shank 13. These cross extensions are preferably shaped to channel form to stiffen them. The extensions have forwardly extending arms 16 at the ends. These arms have perforations 17 so that the arms may be threaded on to the shaft 1a. The arms are struck up around the perforations 17 so as to form spacing projections 17a. These engage the walls 7 of the wheels.

A roller 18 is rotatively mounted between plates 19, the roller being provided with pintles 20 extending through openings 20a in the plates. The end plates are formed and bent up from a cross plate 21. These end plates also have perforations 19a through which the shaft 1a extends. The end plates have a limited movement being provided with stops 19b which engage the arms 16. In order to give a sound imitating an ordinary lawn mower a click wheel 22 having a perforation 22a is mounted on the shaft 1a between one of the arms 16 and the plate 19. A click blade 23 is secured to the plate 19 by means of an ear 24 which is struck up from the plate 19 and provided with a fold 25 within which the blade is secured.

It will be understood that the openings in the discs 3, plate 5, click wheel 22, and plates forming the wheels are squared so as to rotate with the shaft. As the toy is advanced, the wheels rotate, rotate the blades, turn the click wheel and thus give the motion and sound imitating the ordinary lawn mower.

A cross bar 26 is provided at the outer end of the handle 11. This cross bar is formed of sheet metal of channel form and has lips 27 extending from each side of the plate, these lips compressibly engaging the handle. The lips are provided with small prongs, or detents, 28 struck up in the lips as they are formed and are forced into the handle, thus securing the cross bar in place. The cross bar is provided with a perforation 29 through which other securing means may be extended, if desired.

The method of forming the yoke is illustrated in Figs. 7 to 11. A die block 30 is provided with a die opening 31 which is adapted to provide a slot to form a U-shaped blank 33 (see Fig. 8). The sides of this blank are united by a connection 32a. A slot 34 is formed in the die block for cutting off the blank and this has an extension 35 which forms a shallow slot 35a opposite the slot 32. The die block also has openings 36 and 37 for perforating the blank and forming the perforations 17a for the shank. The plunger has a slotting die 38 cutting out the slot 32 and operating with the opening 31, an end cutting die 39 operating with the opening 34, and a notching die 40 operating with an opening 36a for notching the blank to give clearance for the click blade, and punches 41 and 42 for forming openings in the blank. After the blank is formed, it is placed on forming dies 43 and 44 and given a Z shape. This forming die presses the cross extensions to a channel shape and forms the shank portion of the blank including the connection 32a in a reverse curve in cross section, as shown in Fig. 10, making the sides of the blank adjacent to the connections concave, as shown at 47. The dies have a depression 45 and projection 46 for forming the spacing projection 17a on the arms of the yoke. The plate so formed, which is of ordinary Z shape, is placed on a die block 48 with a central depression 49. A round forming die 50 is carried by the plunger of the press and operates on the connection 32a of the plate, pressing it into the depression 49 and carrying the sides around the forming die 50, thus bringing the cross extensions of the yoke into alinement, as shown in Fig. 8, and with the walls of the shank in annular, or cylindrical form split along one side.

A blank for the cross plate is first formed in a blanking die 51 having a blanking slot 52. This slot forms a blank 53, as shown in Fig. 14. A cutting die 54 operates with the blanking opening 52 and has openings 56 operating with punches 55 carried by the die block 51. The blank 53 is placed on a forming die 57 having a forming depression 58 and a forming plunger 59 has a forming end 60 forcing the plate to the shape shown in Fig. 17 giving to the cross member a channel form with lips extending from each side. The cross bar is then placed with the lips at each side of the handle 11, as shown in Fig. 18, and above a forming depression 62 in a forming die 61. A forming plunger 63 has a forming die depression 64 and these dies, acting on the lips with the handle between them, form a cylindrical handle shank clamping, with pressure, the handle between them. In order to more certainly secure the handle the dies are provided with prong cutting dies 65 and 66 for striking up small prongs 67 (see Fig. 19) in the walls of the shank and press these prongs into the wood of the handle. Thus the cross bar is finished and assembled on the handle in this shank forming operation.

What I claim as new is:—

1. In a toy lawn mower, the combination of rotating blades; a mounting therefor comprising wheels; a handle having a sheet metal yoke comprising a handle shank in the form of a split annulus; a cross extension projecting from each side of the annulus; and forwardly projecting arms at the ends of the extensions, said arms being secured to the mounting.

2. In a toy lawn mower, the combination of rotating blades; a mounting therefor comprising wheels and a shaft on which the blades are secured and to which the wheels are secured; a handle having a sheet metal yoke comprising a handle shank in the form of a split annulus; a cross extension projecting from each side of the annulus; and forwardly projecting arms having perforations through which the shaft extends.

3. In a toy lawn mower, the combination of rotating blades; a mounting therefor comprising wheels and a shaft on which the blades are secured and to which the wheels are secured; a handle having a sheet metal yoke comprising a handle shank in the form of a split annulus; a cross extension projecting from each side of the annulus; and forwardly projecting arms having perforations through which the shaft extends, said arms having spacing projections at the shaft.

4. In a toy lawn mower, the combination of rotating blades; a shaft on which the blades are mounted and locked; wheels mounted and locked with the shaft; a click wheel fixed to rotate with the blades; a roller; a plate frame carrying the roller and pivotally mounted on the shaft; a click blade; and an ear struck up on the frame and having a fold securing the click blade.

5. In a toy lawn mower, the combination of blades having ears at their ends; discs through which the ears extend; a spacer plate having slots through which the ears extend, said ears locking the blades with the discs and the discs and spacer plate together; a shaft on which the discs and spacer plate are mounted; and wheels mounted on the shaft.

6. In a toy lawn mower, the combination of blades; a mounting for the blades comprising wheels on which the blades are mounted; a handle secured to the mounting; and a channel form sheet metal cross member having a handle shank comprising lips extending from the sides of the cross member and of concave form to receive the handle.

7. In a toy lawn mower, the combination of blades; a mounting for the blades comprising wheels on which the blades are mounted; a handle secured to the mounting; and a channel form sheet metal cross member having a handle shank comprising lips extending from the sides of the cross member and of concave form to compressibly receive the handle.

ANTHONY N. SMITH.